US012308144B2

(12) United States Patent
Ooshima et al.

(10) Patent No.: US 12,308,144 B2
(45) Date of Patent: May 20, 2025

(54) MULTI-CORE CABLE

(71) Applicant: SUMITOMO ELECTRIC INDUSTRIES, LTD., Osaka (JP)

(72) Inventors: Takumi Ooshima, Tochigi (JP); Jo Yagisawa, Tochigi (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 21 days.

(21) Appl. No.: 18/549,436

(22) PCT Filed: Mar. 19, 2021

(86) PCT No.: PCT/JP2021/011490
§ 371 (c)(1),
(2) Date: Sep. 7, 2023

(87) PCT Pub. No.: WO2022/195874
PCT Pub. Date: Sep. 22, 2022

(65) Prior Publication Data

US 2024/0145128 A1 May 2, 2024

(51) Int. Cl.

| | |
|---|---|
| ***H01B 7/04*** | (2006.01) |
| ***H01B 3/30*** | (2006.01) |
| ***H01B 3/44*** | (2006.01) |
| ***H01B 7/02*** | (2006.01) |
| ***H01B 9/00*** | (2006.01) |
| *H01B 7/18* | (2006.01) |
| *H01B 7/295* | (2006.01) |

(52) U.S. Cl.
CPC ............. *H01B 9/003* (2013.01); *H01B 3/307* (2013.01); *H01B 3/446* (2013.01); *H01B 7/0225* (2013.01); *H01B 7/0275* (2013.01); *H01B 7/04* (2013.01); *H01B 7/1875* (2013.01); *H01B 7/295* (2013.01)

(58) Field of Classification Search
CPC .......... H01B 7/04; H01B 7/0045; H01B 7/17; H01B 9/003
See application file for complete search history.

(56) References Cited

U.S. PATENT DOCUMENTS

| | | | | |
|---|---|---|---|---|
| 4,683,166 A * | 7/1987 | Yuto | H01B 7/2855 428/318.6 |
| 9,928,937 B2 * | 3/2018 | Tanaka | H01B 7/295 |
| 10,662,323 B2 * | 5/2020 | Ho | H01B 3/441 |
| 2005/0171263 A1 * | 8/2005 | Kanamori | C08K 3/016 524/543 |

(Continued)

FOREIGN PATENT DOCUMENTS

| | | |
|---|---|---|
| JP | 2018-032515 | 3/2018 |
| JP | 2019-102268 | 6/2019 |

(Continued)

*Primary Examiner* — Chau N Nguyen
(74) *Attorney, Agent, or Firm* — IPUSA, PLLC

(57) ABSTRACT

A multi-core cable includes two power wires, and a twisted pair signal wire having two twisted signal wires. The power wires and the twisted pair signal wire are twisted together to form a core, and the power wires include a first conductor, and a first insulating layer covering the first conductor. The signal wires include a second conductor, and a second insulating layer covering the second conductor, and a Young's modulus of the second insulating layer is greater than or equal to 700 MPa and less than or equal to 1600 M Pa.

10 Claims, 6 Drawing Sheets

(56) References Cited

U.S. PATENT DOCUMENTS

| | | | | |
|---|---|---|---|---|
| 2016/0176369 | A1* | 6/2016 | Ito | H01B 9/006 174/72 A |
| 2017/0264063 | A1* | 9/2017 | Hayakawa | B60R 16/0215 |
| 2018/0061525 | A1 | 3/2018 | Kohori et al. | |
| 2019/0172606 | A1 | 6/2019 | Kohori | |
| 2020/0185128 | A1* | 6/2020 | Hayakawa | H01B 9/003 |
| 2021/0210251 | A1* | 7/2021 | Hayakawa | H01B 11/02 |
| 2022/0115164 | A1 | 4/2022 | Ooshima et al. | |
| 2022/0238253 | A1 | 7/2022 | Matsumura et al. | |

FOREIGN PATENT DOCUMENTS

| | | | |
|---|---|---|---|
| WO | WO 2017/209298 | * | 12/2017 |
| WO | 2020/240713 | | 12/2020 |
| WO | 2020/246442 | | 12/2020 |

* cited by examiner

MULTI-CORE CABLE

TECHNICAL FIELD

The present disclosure relates to multi-core cables.

BACKGROUND ART

Patent Document 1 describes a multi-core cable including two sheathed electrical wires, and an outer sheath layer covering the two sheathed electrical wires.

PRIOR ART DOCUMENTS

Patent Documents

Patent Document 1: Japanese Laid-Open Patent Publication No. 2018-32515

DISCLOSURE OF THE INVENTION

A multi-core cable according to the present disclosure includes:

two power wires; and a twisted pair signal wire having two twisted signal wires, wherein the power wires and the twisted pair signal wire are twisted together to form a core, the power wires include a first conductor, and a first insulating layer covering the first conductor, the signal wires include a second conductor, and a second insulating layer covering the second conductor, and a Young's modulus of the second insulating layer is greater than or equal to 700 MPa and less than or equal to 1600 MPa.

MODE OF CARRYING OUT THE INVENTION

Figure 1:
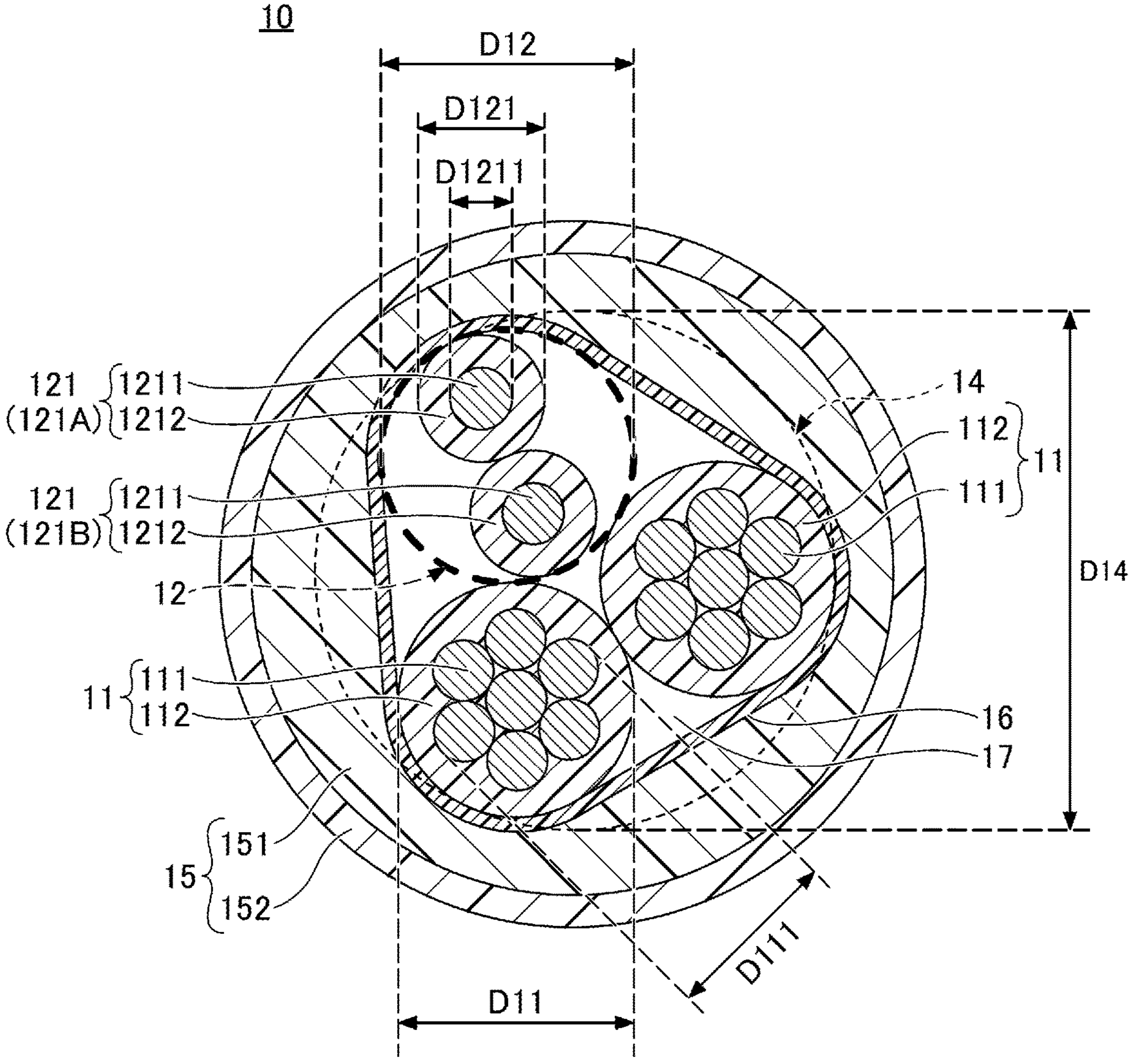
FIG. 1 is a cross sectional view perpendicular to a longitudinal direction of a multi-core cable according to one aspect of the present disclosure.

Problems to be Solved by the Present Disclosure

In order to facilitate bending and routing of wirings in an automobile or the like, a multi-core cable may be required to have power wires and signal wires with reduced diameters, that is, have a reduced outer diameter. However, the outer diameter of the signal wire is usually smaller than the outer diameter of the power wire. For this reason, when the outer diameter of the signal wire is reduced, a bending rigidity of the signal wire deteriorates, and there is a possibility of deteriorating a workability when attaching a terminal or the like to an end portion of the signal wire. Hence, there are demands for a multi-core cable including a signal wire that enables a terminal or the like to be easily attached to an end portion thereof even when the diameter of the signal wire is reduced.

One object of the present disclosure is to provide a multi-core cable including a signal wire that enables a terminal or the like to be easily attached to an end portion thereof even when the diameter of the signal wire is reduced.

Effects of the Present Disclosure

According to the present disclosure, it is possible to provide a multi-core cable including a signal wire that enables a terminal or the like to be easily attached to an end portion thereof even when the diameter of the signal wire is reduced.

Embodiments for carrying out the present disclosure will be described below.

DESCRIPTION OF EMBODIMENTS OF PRESENT DISCLOSURE

First, embodiments of the present disclosure will be described in the following. In the following description, identical or corresponding elements are designated by the same reference numerals, and a repeated description thereof will be omitted.

(1) A multi-core cable according to one aspect of the present disclosure includes:

two power wires; and a twisted pair signal wire having two twisted signal wires, wherein the power wires and the twisted pair signal wire are twisted together to form a core, the power wires include a first conductor, and a first insulating layer covering the first conductor, the signal wires include a second conductor, and a second insulating layer covering the second conductor, and a Young's modulus of the second insulating layer is greater than or equal to 700 MPa and less than or equal to 1600 MPa.

By setting the Young's modulus of the second insulating layer to a value greater than or equal to 700 MPa, a bending rigidity of the signal wires can be increased, and even in a case where the diameter of the signal wire is reduced and made small, a terminal or the like can easily be attached to an end portion along a longitudinal direction thereof. By setting the Young's modulus of the second insulating layer to a value less than or equal to 1600 MPa, the signal wires can easily be bent, and a handleability of the multi-core cable when performing the wiring can be improved. In addition, a flexing resistance of the signal wires can be increased, and disconnection can be reduced even in a case where the signal wire is repeatedly bent and stretched.

(2) The second insulating layer may include high-density polyethylene, and one or more kinds of materials selected from low-density polyethylene and an ethylene-vinyl acetate (EVA) copolymer, and a content percentage of the high-density polyethylene is greater than or equal to 40 mass % and less than or equal to 60 mass %.

By using the material described above for the second insulating layer, the Young's modulus of the second insulating layer can be easily adjusted to a desired range.

(3) A Young's modulus of the first insulating layer may be smaller than the Young's modulus of the second insulating layer.

An outer diameter of the power wires is usually larger than an outer diameter of the signal wires. A thickness of the first insulating layer is also usually thicker than a thickness of the second insulating layer. Hence, by making the Young's modulus of the first insulating layer smaller than the Young's modulus of the second insulating laver, the power wires can be bent particularly easily, and the handleability of the multi-core cable when performing the wiring can be improved.

(4) An outer diameter of the signal wires may be greater than or equal to 1.00 mm and less than or equal to 1.35 mm, and a twist pitch of the twisted pair signal wire may be greater than or equal to 20 times and less than or equal to 80 times the outer diameter of the signal wires.

By setting the outer diameter of the signal wires to a value greater than or equal to 1.00 mm, it is possible to particularly increase the bending rigidity of the signal wires, and the workability when attaching the terminal or the like to the end portion along the longitudinal direction of the signal wires can be improved. By setting the outer diameter of the signal wires to a value less than or equal to 1.35 mm, the diameter of the signal wires can be reduced, and the diameter of the multi-core cable can also be reduced.

By setting the twist pitch of the twisted pair of signal wires to a value greater than or equal to 20 times the outer diameter of the signal wires, an unevenness of a surface of the twisted pair signal wire can be reduced, so as to facilitate processing of the twisted pair signal wire. In addition, by setting the twist pitch of the twisted pair signal wire to a value less than or equal to 80 times the outer diameter of the signal wires, it is possible to improve a signal quality of a signal transmitted by the twisted pair signal wire.

(5) An outer diameter of the power wires may be greater than or equal to 2.20 mm and less than or equal to 2.50 mm, and a twist pitch of the core may be greater than or equal to 10 times and less than or equal to 25 times an outer diameter of the core.

By setting the outer diameter of the power wire to a value greater than or equal to 2.20 mm, a sufficient outer diameter of the first conductor and a sufficient thickness of the first insulating layer can be ensured. For this reason, it is possible to reduce a resistance when power is supplied, and to improve a durability of the power wire. By setting the outer diameter of the power wire to a value less than or equal to 2.50 mm, it is possible to reduce the diameter of the power wires, and to also reduce the diameter of the multi-core cable. For this reason, it is possible to improve the handleability of the multi-core cable when performing the wiring.

By setting the twist pitch of the core to a value greater than or equal to 10 times the outer diameter of the core, an unevenness of a core surface can be reduced, and a cross section perpendicular to the longitudinal direction of the multi-core cable, including the core, can be made close to a perfect circle. In addition, by setting the twist pitch of the core to a value less than or equal to 25 times the outer diameter of the core, it is possible to particularly increase a flexibility of the multi-core cable including the core, and to obtain an excellent handleability of the multi-core cable when performing the wiring or the like.

(6) An outer diameter of the signal wires may be greater than or equal to 1.10 mm and less than or equal to 1.32 mm, and the Young's modulus of the second insulating layer may be greater than or equal to 700 MPa and less than or equal to 1550 MPa.

(7) An outer diameter of the signal wires may be greater than or equal to 1.15 mm and less than or equal to 1.30 mm, and the Young's modulus of the second insulating layer may be greater than or equal to 1000 MPa and less than or equal to 1500 MPa.

(8) The multi-core cable may include a twisted pair electrical wire having two twisted electrical wires, the electrical wires may include a third conductor, and a third insulating layer covering the third conductor, the core may include the twisted pair electrical wire, with the power wires, the twisted pair signal wire, and the twisted pair electrical wire twisted together, and a Young's modulus of the third insulating layer may be greater than or equal to 700 MPa and less than or equal to 1600 MPa.

When the multi-core cable includes the twisted pair electrical wire, the multi-core cable can be used in various applications and has a high versatility.

By setting the Young's modulus of the third insulating layer to a value greater than or equal to 700 MPa, the bending rigidity of the electrical wires can be increased, and even in a case where the diameter of the electrical wire is reduced and made small, a terminal or the like can easily be attached to an end portion along a longitudinal direction thereof. By setting the Young's modulus of the third insulating layer to a value less than or equal to 1600 MPa, the electrical wires can easily be bent, and a handleability of the multi-core cable when performing the wiring can be improved. In addition, a flexing resistance of the electrical wires can be increased, and disconnection can be reduced even in a case where the electrical wire is repeatedly bent and stretched.

(9) An outer diameter of the third conductor may be smaller than an outer diameter of the second conductor.

By making the outer diameter of the third conductor smaller than the outer diameter of the second conductor, the diameters of the electrical wires and the twisted pair electrical wire can be reduced, and the diameter of the multi-core cable can also be reduced. For this reason, it is possible to improve the handleability of the multi-core cable when performing the wiring or the like. In addition, although dependent on a combination of sheathed electrical wires forming the multi-core cable, the cross section perpendicular to the longitudinal direction of the multi-core cable can be made close to a perfect circle, by making the outer diameter of the third conductor smaller than the outer diameter of the second conductor.

Details of Embodiments of the Present Disclosure

Specific examples of a multi-core cable according to one embodiment of the present disclosure (hereinafter referred to as "the present embodiment") will be described below, with reference to the drawings. The present invention is not limited to these examples, and is intended to include what is defined in the claims, and all modifications within the meaning and scope equivalent to the scope of claims.

(1) Configuration of Multi-Core Cable

First, a configuration of a multi-core cable according to the present embodiment will be described, based on FIG. 1 through FIG. 4.

<Configuration of FIG. 1>

FIG. 1 is a cross sectional view along a plane perpendicular to a longitudinal direction of a multi-core cable 10 according to the present embodiment.

As illustrated in FIG. 1, the multi-core cable 10 according to the present embodiment includes two power wires 11, and a twisted pair signal wire 12 having two twisted signal wires 121.

In the multi-core cable 10, the power wires 11 which are sheathed electrical wires, and the twisted pair signal wire 12, are twisted together to form a core 14. In a case where the sheathed electrical wires forming the core 14 are twisted, a twisting direction is not particularly limited, and the sheathed electrical wires can be twisted in either a counter-clockwise direction or a clockwise direction. The same applies to cores 24, 34, and 44 which will be described below.

The plurality of sheathed electrical wires Included in the multi-core cable according to the present embodiment is not limited to the configuration example illustrated in FIG. 1, and an arbitrary number of sheathed electrical wires having an arbitrary configuration can be included according to a device or the like to which the multi-core cable is to be connected. Other configuration examples of the plurality of sheathed electrical wires included in the multi-core cable according to the present embodiment will be described below.

Figure 2:
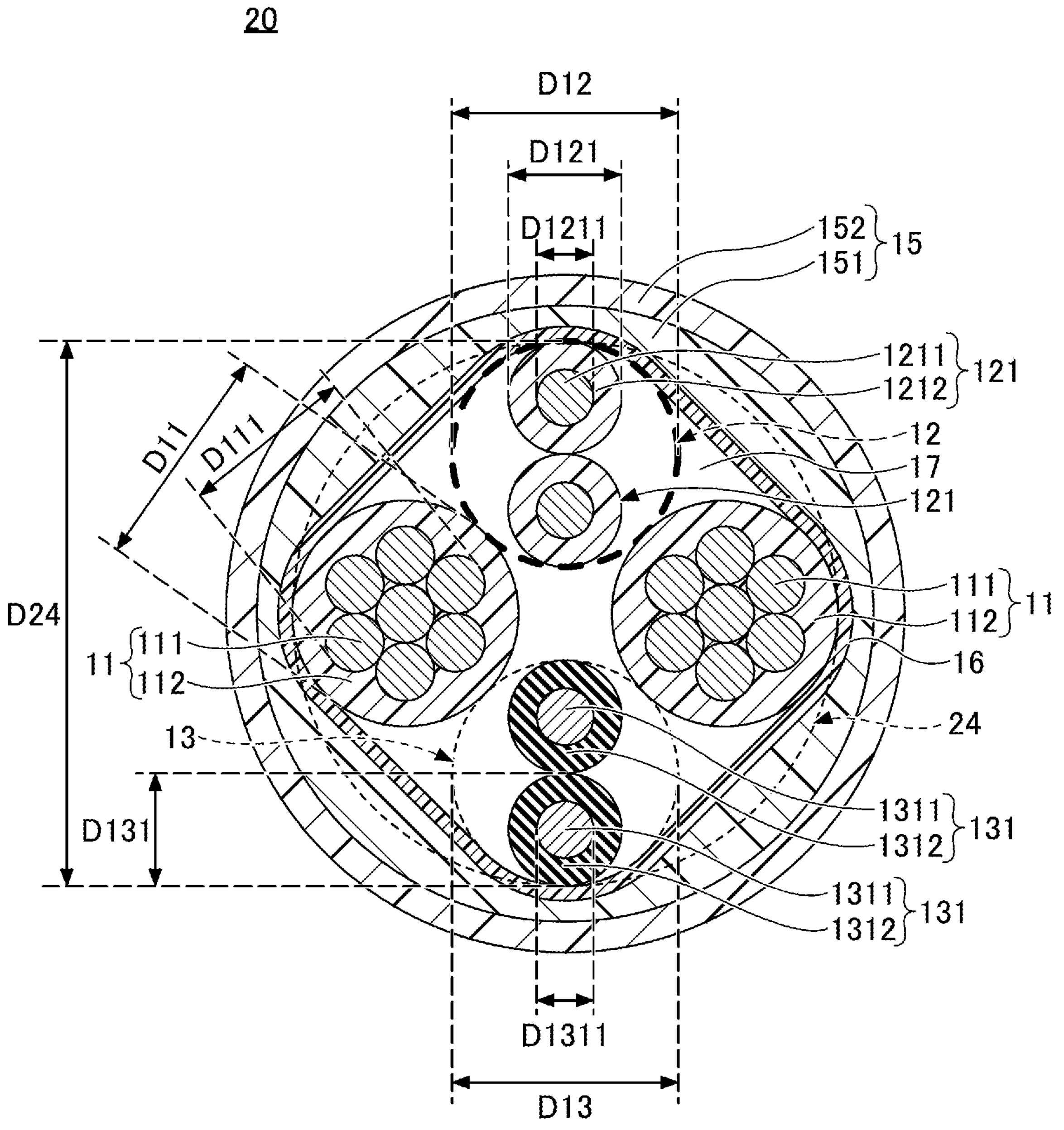
FIG. 2 is another configuration example of the cross sectional view perpendicular to the longitudinal direction of the multi-core cable according to one aspect of the present disclosure.
Figure 3:
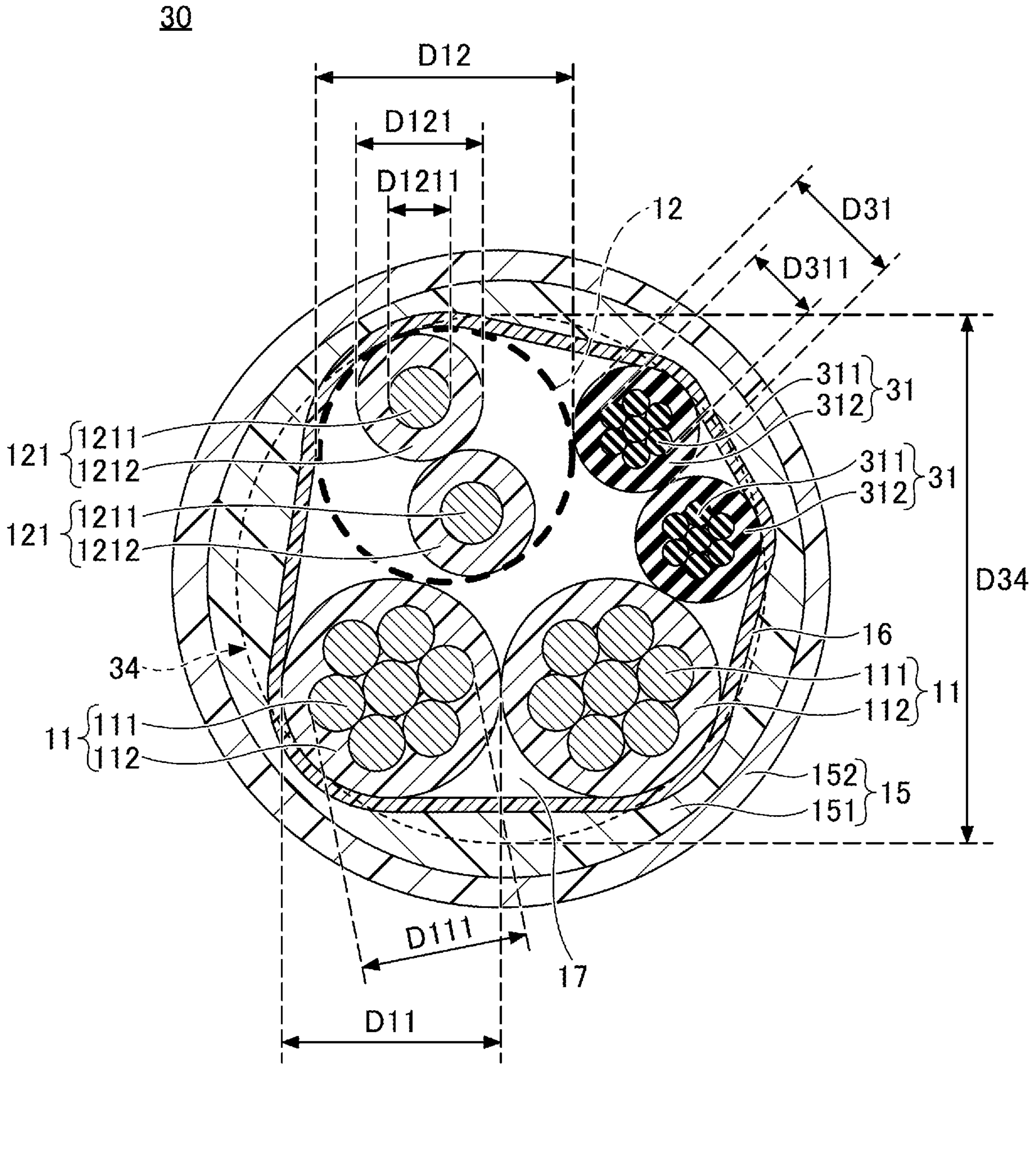
FIG. 3 is another configuration example of the cross sectional view perpendicular to the longitudinal direction of the multi-core cable according to one aspect of the present disclosure.
Figure 4:
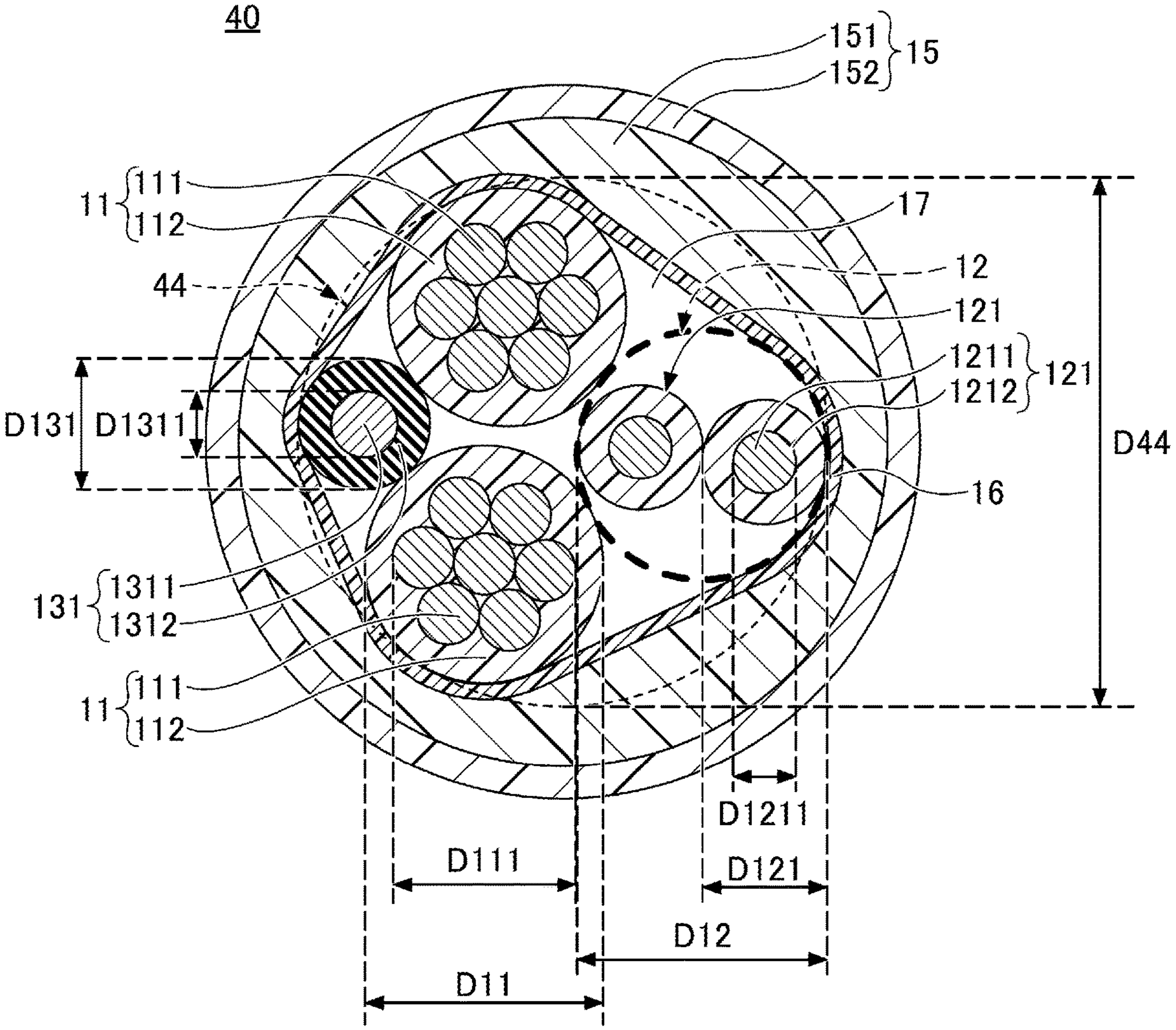
FIG. 4 is another configuration example of the cross section perpendicular to the longitudinal direction of the multi-core cable according to one aspect of the present disclosure.

FIG. 2 through FIG. 4 are cross sectional views along the plane perpendicular to the longitudinal direction of a multi-core cable 20, a multi-core cable 30, and a multi-core cable 40 according to other configuration examples of the present embodiment, respectively.

<Configuration of FIG. 2>

For example, the multi-core cable 20 illustrated in FIG. 2 includes a twisted pair electrical wire 13 having two twisted electrical wires 131, in addition to the two power wires 11, and the twisted pair signal wire 12 having the two twisted signal wires 121. In the multi-core cable 20 illustrated in FIG. 2, the core 24 includes the twisted pair electrical wire 13, with the power wires 11, the twisted pair signal wire 12, and the twisted pair electrical wire 13 twisted together.

Because the multi-core cable 20 includes the twisted pair electrical wire 13, the multi-core cable can be used in various applications and has a high versatility Although the multi-core cables 10 and 20 of FIG. 1 and FIG. 2 only includes one twisted pair signal wire 12, the number of twisted pair signal wires 12 included in the multi-core cable is not particularly limited, and can be greater than or equal to two.

For example, the twisted pair electrical wire 13 in FIG. 2 can be used as the twisted pair signal wire 12, so as to form a multi-core cable including two twisted pair signal wires.

When two twisted pair signal wires are provided as described above, it is preferable that one of the two power wires 11 makes contact with both of the two twisted pair signal wires 12, and the other of the two power wires 11 makes contact with both of the two twisted pair signal wires 12. In addition, from a viewpoint of improving a flexibility of the multi-core cable, it is preferable to provide a gap between the two power wires 11 and a gap between the two twisted pair signal wires 12, so that the two power wires 11 do not make contact with each other and the two twisted pair signal wires 12 do not make contact with each other. That is, in the multi-core cable 20 illustrated in FIG. 2, it is preferable to arrange each wire in a manner similar to the case where the twisted pair electrical wire 13 is used as the twisted pair signal wire 12.

<Configuration of FIG. 3>

The multi-core cable can include three or more power wires.

The multi-core cable 30 illustrated in FIG. 3 further includes two power wires 31, in addition to the two power wires 11. When distinguishing the two kinds of power wires from each other in FIG. 3, the power wire 11 is referred to as a first power wire, and the power wire 31 is referred to as a second power wire.

In a case where the multi-core cable includes three or more power wires, the multi-core cable can be formed solely of power wires having the same outer diameter, first conductors which will be described later having the same outer diameter, or the like, however, a combination of power wires having different outer diameters, the first conductors having different outer diameters, or the like can be used, as in the multi-core cable 30 illustrated in FIG. 3.

The two second power wires do not need to be twisted together, and other sheathed wires can be twisted together with the two second power wires so as to form the core.

In the multi-core cable 30 illustrated in FIG. 3, the core 34 includes two power wires 11 which are the first power wires, two power wires 31 which are the second power wires, and a twisted pair signal wire 12, with the power wires 11, the power wires 31, and the twisted pair signal wire 12 twisted together.

<Configuration of FIG. 4>

An electrical wire 131 can include a single electrical wire instead of the twisted pair electrical wire 13, as in the multi-core cable 40 illustrated in FIG. 4. In the multi-core cable 40 illustrated in FIG. 4, the core 44 includes the electrical wire 131, with the power wires 11, the twisted pair signal wire 12, and the electrical wire 131 twisted together.

<Others>

The twist pitch of the core is not particularly limited, but is preferably greater than or equal to 10 times and less than or equal to 25 times the outer diameter of the core, for example.

This is because, by setting the twist pitch of the core to a value greater than or equal to 10 times the outer diameter of the core, unevenness of a core surface can be reduced, and the cross section perpendicular to the longitudinal direction of the multi-core cable, including the core, can be made close to a perfect circle. In addition, by setting the twist pitch of the core to a value less than or equal to 25 times the outer diameter of the core, it is possible to particularly increase the flexibility of the multi-core cable including the core, and to obtain an excellent handleability of the multi-core cable when performing the wiring or the like.

The outer diameter of the core refers to the diameter of the core in the cross section perpendicular to the longitudinal direction of the multi-core cable. For this reason, the outer diameters of the cores 14 through 44 illustrated in FIG. 1 through FIG. 4 are indicated as an outer diameter D14, an outer diameter D24, an outer diameter D34, and an outer diameter D44. However, because the outer diameter of the core may vary slightly depending on the measured cross section, the outer diameter is preferably an average value of the outer diameters measured for a plurality of cross sections.

The outer diameter of the core can be measured and calculated by the following procedure. In three cross sections to be measured, arranged along the longitudinal direction of the multi-core cable, a length of the core along a long axis is measured by a dimension measuring device, such as a micrometer or the like. A distance between adjacent cross sections to be measured is assumed to be 1 m along the longitudinal direction of the multi-core cable. An average value of the lengths of the core along the long axis measured in the three cross sections to be measured, can be used as the outer diameter of the core of the multi-core cable. The outer diameters of the twisted pair signal wire, and the twisted pair electrical wire, which are stranded wires formed by twisting a plurality of sheathed electrical wires, can also be measured in a similar manner.

The twist pitch of the core refers to a length along which the sheathed electrical wire forming the core is twisted once. The length refers to a length along a center axis of the core. Because the twist pitch of the core can be measured in a manner similar to measuring the twist pitch of the twisted pair signal wire which will be described later, a description thereof will be omitted.

(2) Regarding Each Member Included in Multi-Core Cable

Next, each member of the multi-core cable will be described.

(2-1) Power Wire

For example, as illustrated in FIG. 1, the power wire 11 includes first conductors 111, and a first insulating layer 112 covering the first conductors 111. The power wire 31 illustrated in FIG. 3 similarly includes first conductors 311, and a first insulating layer 312 covering outer peripheries of the first conductors 311.

The power wires 11 and the power wires 31 can be used to transmit power and a control signal from an electronic control unit (ECU), for example, to an outside of a vehicle. For example, the power wires can be used to control an electric parking brake (EPB). The EPB has a motor that drives a brake caliper. Further, the power wires can be used as a power supply wire or a control wire for use in a damper control system that varies hydraulic characteristics of a suspension.

Hereinafter, the power wire 11 will be described as an example, but the power wire 31 can be configured in a similar manner.

(First Conductor)

The first conductor 111 can be formed by a plurality of element wires that are twisted together. A wire formed of copper or a copper alloy can be used for the element wire. The element wire can be formed of a material having a predetermined conductivity and flexibility, other than copper and the copper alloy, such as a tin-plated annealed copper wire, an annealed copper wire, or the like. The element wire can be formed of a hard drawn copper wire. A cross sectional area of the first conductor 111 is not particularly limited, but is preferably greater than or equal to 1.0 $mm^2$ and less than or equal to 1.5 $mm^2$, more preferably greater than or equal to 1.1 $mm^2$ and less than or equal to 1.4 $mm^2$, for example. As illustrated in FIG. 1, the first conductor 111 can include a plurality of conductors that are formed by a plurality of element wires twisted together. In a case where the first conductor 111 includes a plurality of conductors, a sum of the cross sectional areas thereof preferably satisfies the range described above.

By setting the cross sectional area of the first conductor 111 to a value less than or equal to 1.5 $mm^2$, the cross sectional area of the power wires 11 can be reduced, and the cross sectional area of the multi-core cable 10 can also be reduced. As a result, the outer diameter of the multi-core cable 10 can be reduced to a small diameter.

In addition, by setting the cross sectional area of the first conductors 111 to a value greater than or equal to 1.0 $mm^2$, it is possible to reduce a resistance when power is supplied.

(First Insulating Layer)

The first insulating layer 112 can include a composition including a synthetic resin as a main component thereof, and can cover the first conductors 111 by being laminated on outer peripheries of the first conductors 111. An average thickness of the first insulating layer 112 is not particularly limited, but can be greater than or equal to 0.1 mm and less than or equal to 0.5 mm, for example. The "average thickness" refers to an average value of thicknesses measured at ten arbitrary points. Hereinafter, the term "average thickness" is also defined in a similar manner for other members or the like.

The main component of the first insulating layer 112 is not particularly limited as long as the main component has insulating properties, but is preferably a copolymer of ethylene and an α-olefin having a carbonyl group (hereinafter also referred to as a main component resin) from a viewpoint of improving the flexing resistance at low temperatures. A content of the α-olefin having the carbonyl group in the main component resin is preferably greater than or equal to 14 mass %, and more preferably greater than or equal to 15 mass %. The content of the α-olefin having the carbonyl group is preferably less than or equal to 46 mass %, and more preferably less than or equal to 30 mass %. The content of the α-olefin having the carbonyl group is preferably set greater than or equal to 14 mass %, because it is possible to particularly improve the flexing resistance at the low temperatures. The content of the α-olefin having the carbonyl group is preferably set less than or equal to 46 mass %, because it is possible to improve mechanical characteristics, such as the strength or the like of the first insulating layer 112.

The α-olefin having the carbonyl group preferably includes one or more kinds of materials selected from alkyl (meth) acrylates, such as methyl (meth) acrylate, ethyl (meth) acrylate, or the like; aryl (meth) acrylates, such as phenyl (meth) acrylate, or the like; vinyl esters, such as vinyl acetate, vinyl propionate, or the like; unsaturated acids, such as (meth) acrylic acid, crotonic acid, maleic acid, itaconic acid, or the like; vinyl ketones, such as methyl vinyl ketone, phenyl vinyl ketone, or the like; and amides of (meth) acrylic acid. Among these materials, one or more kinds of materials selected from alkyl (meth) acrylates and vinyl esters are preferable, and one or more materials selected from ethyl acrylate and vinyl acetate are more preferable.

Examples of the main component resin include resins, such as ethylene-vinyl acetate (EVA) copolymer, ethylene-ethyl acrylate (EEA) copolymer, ethylene-methyl acrylate (EMA) copolymer, ethylene-butyl acrylate (EBA) copolymer, or the like, for example, and among these resins, one or more kinds of resins selected from EVA and EEA are preferable.

The first insulating layer 112 can include a resin other than the main component resin described above.

A content of the other resin in the resin material (resin component) is preferably less than or equal to 60 mass %, more preferably less than or equal to 30 mass %, and still more preferably less than or equal to 10 mass %. In addition, the first insulating layer 112 may not include the other resin.

The resin material included in the first insulating layer 112 is not limited to the examples described above, and for example, a resin material similar to a resin material used for the second insulating layer 1212 which will be described later can also be used therefor.

The first insulating layer 112 can include additives, such as a flame retardant, a flame retardant assistant, an antioxidant, a lubricant, a coloring agent, a reflection imparting agent, a masking agent, a processing stabilizer, a plasticizer, or the like.

Examples of the flame retardant include halogen-based flame retardants, such as a bromine-based flame retardant, a chlorine-based flame retardant, or the like, and non-halogen-based flame retardants, such as a metal hydroxide, a nitrogen-based flame retardant, a phosphorus-based flame retardant, or the like. One kind of flame retardant can be used by itself, or two or more kinds of flame retardants can be used in combination.

Examples of the bromine-based flame retardant include decabromodiphenylethane or the like, for example. Examples of the chlorine-based flame retardant include chlorinated paraffin, chlorinated polyethylene, chlorinated polyphenol, perchloropentacyclodecane, or the like, for example. Examples of the metal hydroxide include magnesium hydroxide, aluminum hydroxide, or the like, for example. Examples of the nitrogen-based flame retardant include melamine cyanurate, triazine, isocyanurate, urea, guanidine, or the like, for example. Examples of the phosphorus-based flame retardant include metal phosphinate, phosphaphenanthrene, melamine phosphate, ammonium phosphate, phosphate ester, polyphosphazene, or the like, for example.

The flame retardant is preferably a non-halogen-based flame retardant from a viewpoint of reducing an environmental load, and metal hydroxide, a nitrogen-based flame retardant, and a phosphorus-based flame retardant are more preferable.

When the first insulating layer 112 includes the flame retardant, a content of the flame retardant in the first insulating layer 112 is preferably greater than or equal to 10 parts by mass, and more preferably greater than or equal to 50 parts by mass, with respect to 100 parts by mass of the resin material. On the other hand, the content of the flame retardant is preferably less than or equal to 200 parts by mass, and more preferably less than or equal to 130 parts by mass, with respect to 100 parts by mass of the resin material. By setting the content of the flame retardant to a value greater than or equal to 10 parts by mass with respect to 100 parts by mass of the resin material, a particularly sufficient flame retardant effect can be imparted. Moreover, by setting the content of the flame retardant to a value less than or equal to 200 parts by mass with respect to 100 parts by mass of the resin material, extrusion molding of the first insulating layer 112 becomes particularly easy to perform, and the mechanical characteristics, such as elongation, tensile strength, or the like can be improved.

The resin material of the first insulating layer 112 is preferably cross linked. Examples of a method of crosslinking the resin material of the first insulating layer 112 include a method of irradiating ionizing radiation, a method of using a thermal crosslinking agent, a method of using a silane graftmer, or the like, and the method of irradiating the ionizing radiation is the preferable method. Further, in order to promote the crosslinking, a silane coupling agent is preferably added to the composition forming the first insulating layer 112.

The Young's modulus of the first insulating layer 112 can be greater than or equal to 100 MPa and less than or equal to 800 MPa, and can also be greater than or equal to 100 MPa and less than or equal to 700 MPa, for example. By setting the Young's modulus of the first insulating layer 112 to a value greater than or equal to 100 MPa, it is possible to sufficiently increase the bending rigidity of the power wire 11, and particularly improve the workability when attaching the terminal or the like to the end portion. In addition, by setting the Young's modulus of the first insulating layer 112 to a value less than or equal to 800 MPa, bending of the power wire 11 becomes particularly easy to perform, and the handleability of the multi-core cable when performing the wiring can be improved.

The Young's modulus of the first insulating layer 112 is preferably smaller than the Young's modulus of the second insulating layer 1212. An outer diameter D11 of the power wire 11 is usually larger than an outer diameter D121 of the signal wire 121. Moreover, the thickness of the first insulating layer 112 is also usually greater than the thickness of the second insulating layer 1212. Hence, by setting the Young's modulus of the first insulating layer 112 to a value smaller than the Young's modulus of the second insulating layer 1212, bending of the power wire 11 becomes particularly easy to perform, and the handleability of the multi-core cable when performing the wiring can be improved.

(Outer Diameter)

The outer diameter D11 of the power wire 11 is not particularly limited, but is preferably greater than or equal to 2.20 mm and less than or equal to 2.50 mm, and more preferably greater than or equal to 2.25 mm and less than or equal to 2.45 mm. By setting the outer diameter D11 of the power wire 11 to a value greater than or equal to 2.20 mm, a sufficient outer diameter of the first conductor 111 and a sufficient thickness of the first insulating layer 112 can be ensured. For this reason, it is possible to reduce the resistance when power is supplied, and to improve the durability of the power wire. By setting the outer diameter D11 of the power wire 11 to a value less than or equal to 2.50 mm, the diameter of the power wire 11 can be reduced, and the diameter of the multi-core cable can also be reduced. As a result, the handleability of the multi-core cable when performing the wiring or the like can be improved The outer diameter of power wire 11 can be measured according to JIS C 3005 (2014). More particularly, the outer diameter of the power wire is measured at two or more positions on the same plane perpendicular (at right angles) to the center axis (wire axis) of the power wire, and an average value of the measured outer diameters can be used as the outer diameter of the power wire.

When the outer diameter of the power wire is measured as described above at two or more positions on the same plane perpendicular to the center axis of the power wire, that is, in one cross section perpendicular to the center axis of the power wire, the outer diameter is measured along the diameter of the power wire. When performing the measurement described above, the measurement positions are preferably selected so that angles among a plurality of diameters of the power wire to be measured are approximately the same. More particularly, on the plane perpendicular to the center axis of the power wire to be measured, for example, the outer diameter of the power wire is measured along two orthogonal diameters, and an average value of the measured diameters can be used as the outer diameter of the power wire. The outer diameter of other sheathed electrical wires, such as the signal wire, the electrical wire, or the like, and the outer diameter of the conductor of each sheathed electrical wire, can also be measured in a similar manner.

(2-2) Signal Wire and Twisted Pair Signal Wire

The signal wire 121 includes a second conductor 1211, and a second insulating layer 1212 covering the second conductor 1211. An outer diameter D1211 of the second conductor 1211 is preferably smaller than an outer diameter D111 of the first conductor 111. As described above, two signal wires 121 can be twisted together to form the twisted pair signal wire 12. The two signal wires 121 that are twisted together along the longitudinal direction may have the same size and use the same material.

(2-2-1) Signal Wire

The signal wires 121 can be used to transmit a signal from a sensor, or to transmit a control signal from the ECU. The two signal wires 121 can be used for the wiring of an anti-lock brake system (ABS), for example. Each of the two signal wires 121 can be used as a wire connecting a differential wheel speed sensor and the ECU of the vehicle, for example. The two signal wires 121 can be used for transmitting other signals.

(Second Conductor)

The second conductor 1211 can be formed by a plurality of element wires that are twisted together. For example, as illustrated in FIG. 1, the second conductor 1211 can include one conductor formed by a plurality of element wires twisted together, or include a plurality of such conductors.

Figure 5A:
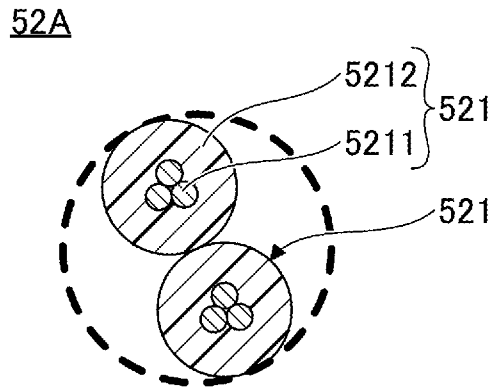
FIG. 5A is a diagram for explaining another configuration example of a twisted pair signal wire.

More particularly, similar to the signal wire 121 illustrated in FIG. 1 or the like, for example, the second conductor 1211 can be formed by one conductor described above. In addition, similar to a signal wire 521 of the twisted pair signal wire 52A illustrated in FIG. 5A, a second conductor 5211 may include a plurality of the conductors described above. In the case of the signal wire 521 illustrated in FIG. 5A, the plurality of conductors included in the second conductor 5211 are preferably twisted together. The twisted pair signal wire 52A and the signal wire 521 illustrated in FIG. 5A can be configured in a manner similar to the other twisted pair signal wire 12 and the signal wire 121, except that the different configuration of the second conductor 5211. Similar to the signal wire 121, the signal wire 521 can further include a second insulating layer 5212 that covers the second conductor 5211.

The second conductor 1211 can be formed of the same material as the conductor forming the first conductor 111 described above, or can be formed of a material different from the conductor forming the first conductor 111. A cross sectional area of the second conductor 1211 is not particularly limited, and can be greater than or equal to 0.13 $mm^2$ and less than or equal to 0.5 $mm^2$, for example. Similar to the signal wire 521 illustrated in FIG. 5A described above, in a case where the second conductor 5211 includes a plurality of conductors, a sum of the cross sectional areas of the plurality of conductors included in the second conductor 5211 preferably satisfies the range described above.

Inventors of the present invention studied a multi-core cable including a signal wire to which a terminal can easily be attached to an end portion thereof even when the diameter thereof is reduced. As a result, it was found that by setting the Young's modulus of the second insulating layer 1212 covering the second conductor 1211 of the signal wire 121 to a value in a predetermined range, the bending rigidity of the signal wire 121 can be increased, and the terminal or the like can easily be attached to the end portion even when the diameter of the signal wire 121 is reduced.

(Second Insulating Layer)

The Young's modulus of the second insulating layer 1212 is preferably greater than or equal to 700 MPa and less than or equal to 1600 MPa, more preferably greater than or equal to 700 MPa and less than or equal to 1550 MPa, and still more preferably greater than or equal to 1000 MPa and less than or equal to 1500 MPa. By setting the Young's modulus of the second insulating layer 1212 to a value greater than or equal to 700 MPa, which was conventionally not considered because the multi-core cable becomes difficult to bend or the like, the bending rigidity of the signal wire 121 can be increased, and the terminal or the like can easily be attached to the end portion along the longitudinal direction even when the diameter of the signal wire 121 is reduced. However, the multi-core cable is required to bend easily when wiring the automobile or the like, and to be handled with ease when routing the wiring. Accordingly, the Young's modulus of the second insulating layer 1212 of the signal wire 121 is preferably less than or equal to 1600 MPa. By setting the Young's modulus of the second insulating layer 1212 to a value less than or equal to 1600 MPa, the signal wire 121 can easily be bent, and the handleability when performing the wiring can be improved. In addition, the flexing resistance of the signal wire 121 can be increased, and disconnection can be reduced even in a case where the signal wire 121 is repeatedly bent and stretched.

A material used for the second insulating layer 1212 can be selected so that the Young's modulus falls within the range described above. The material used for the second insulating layer 1212 is not particularly limited, but the second insulating layer 1212 can include, as a resin material, high-density polyethylene, and one or more materials selected from low-density polyethylene and ethylene-vinyl acetate (EVA) copolymer.

The high-density polyethylene corresponds to polyethylenes having a material density greater than or equal to 0.942 $g/cm^3$, and the low-density polyethylene corresponds to polyethylenes having a material density less than or equal to 0.942 $g/cm^3$. The density of the resin can be evaluated based on JIS K 7112 (1999).

A content by percentage of the high-density polyethylene in the second insulating layer 1212 is preferably greater than or equal to 40 mass % and less than or equal to 60 mass %, and more preferably greater than or equal to 45 mass % and less than or equal to 55 mass %. By setting the content by percentage of the high-density polyethylene in the second insulating layer 1212 to a value greater than or equal to 40 mass %, the bending rigidity of the signal wire 121 is particularly increased, and the terminal or the like can easily be attached to the end portion along the longitudinal direction, even when the diameter of the signal wire 121 is reduced. In addition, by setting the content by percentage of the high-density polyethylene in the second insulating layer 1212 to a value less than or equal to 60 mass %, the content by percentage of the low-density polyethylene or the like can be ensured, and the Young's modulus of the second insulating layer 1212 can easily be adjusted to a desired range.

By using the material described above for the second insulating layer 1212, the Young's modulus of the second insulating layer 1212 can easily be adjusted to a desired range. The following Table 1 illustrates an example of a relationship between the composition and the Young's modulus of the second insulating layer 1212. In Table 1, HDPE (High Density Polyethylene) represents the high-density polyethylene, and LLDPE (Linear Low Density Polyethylene) represents the low-density polyethylene. In addition, EVA represents the ethylene-vinyl acetate copolymer, and EEA represents the ethylene-ethyl acrylate copolymer. Examples of specific product names of the respective resins are also illustrated. In Table 1, a compound ratio of an inorganic material is illustrated with respect to 100 parts by mass of the resin material. The inorganic material is not particularly limited, and one or more materials selected from magnesium hydroxide, aluminum hydroxide, antimony trioxide, and zinc oxide can be used for the inorganic material, for example.

Table 1 also illustrates compound examples of the first insulating layer, although limited to two examples. Table 1 merely illustrates the compound examples, and the present invention is not limited to such compound examples.

TABLE 1

| | | | Second insulating layer (parts by mass) | | | | | | First insulating layer (parts by mass) | |
|---|---|---|---|---|---|---|---|---|---|---|
| | | | Compound example 1 | Compound example 2 | Compound example 3 | Compound example 4 | Compound example 5 | Compound example 6 | Compound example 1 | Compound example 2 |
| Young's modulus [MPa] | | | 400 | 700 | 1160 | 1500 | 1600 | 1800 | 180 | 700 |
| Resin | HDPE | Hi-Zex | 50 | 50 | 50 | 50 | 60 | 75 | 28 | 50 |
| material | EVA | Evaflex | 50 | 35 | 15 | — | — | — | — | 35 |
| | LLDPE | DFDJ | — | 15 | 35 | 50 | 40 | 25 | 28 | 15 |
| | EEA | ReX Pearl | — | — | — | — | — | — | 44 | — |
| Inorganic material | | | 96 | 38 | 38 | 38 | 38 | 38 | 56 | 38 |

(Outer Diameter)

The outer diameter D121 of the signal wire 121 is not particularly limited, but is preferably greater than or equal to 1.00 mm and less than or equal to 1.35 mm, more preferably greater than or equal to 1.10 mm and less than or equal to 1.32 mm, and still more preferably greater than or equal to 1.15 mm and less than or equal to 1.30 mm or less. By setting the outer diameter D121 of the signal wire 121 to a value greater than or equal to 1.00 mm, the bending rigidity of the signal wire 121 can be particularly increased, and the workability when attaching the terminal or the like to the end portion along the longitudinal direction of the signal wire 121 can be improved. By setting the outer diameter D121 of the signal wire 121 to a value less than or equal to 1.35 mm, the diameter of the signal wire 121 can be reduced, and the diameter of the multi-core cable can also be reduced.

(2-2-2) Twisted Pair Signal Wire (Twist Pitch of Twisted Pair Signal Wire)

The twist pitch of the twisted pair signal wire 12 is not particularly limited, but is preferably greater than or equal to 20 times and less than or equal to 80 times, more preferably greater than or equal to 25 times and less than or equal to 70 times the outer diameter D121 of the signal wire 121, for example. By setting the twist pitch of the twisted pair signal wire to a value greater than or equal to 20 times the outer diameter D121 of the signal wire 121, it is possible to reduce the unevenness of the surface of the twisted pair signal wire, so as to facilitate the processing of the twisted pair signal wire. Further, by setting the twist pitch of the twisted pair signal wires to a value less than or equal to 80 times the outer diameter D121 of the signal wire 121, it is possible to improve the signal quality of the signal transmitted by the twisted pair signal wire.

The twist pitch of the twisted pair signal wire 12 refers to a length along which the signal wire 121 forming the twisted pair signal wire 12 is twisted once. The length refers to a length along a center axis of the twisted pair signal wire 12.

Figure 6:
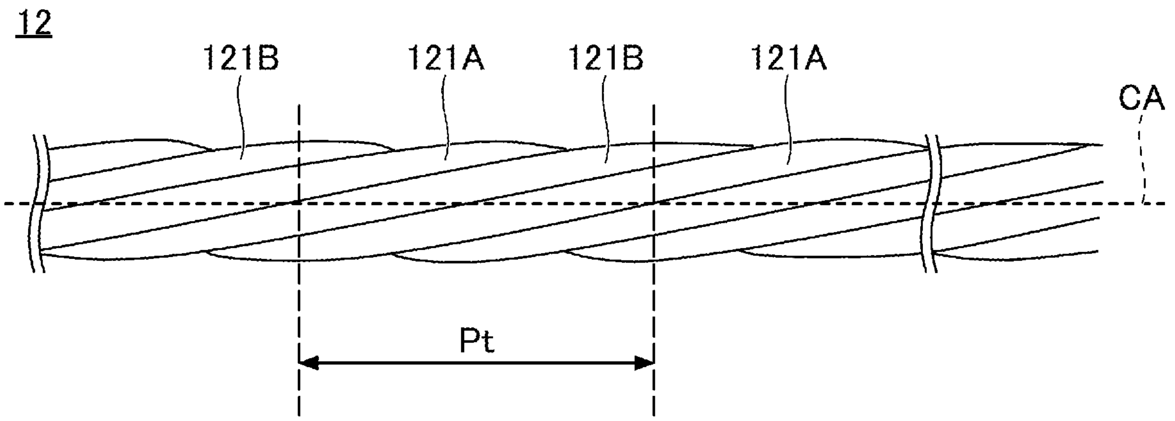
FIG. 6 is a diagram for explaining a twist pitch.

One signal wire forming the twisted pair signal wire 12 is referred to as a first signal wire 121A, and the other signal wire forming the twisted pair signal wire 12 is referred to as a second signal wire 121B. FIG. 6 illustrates a side view of the twisted pair signal wire 12. The first signal wire 121A and the second signal wire 121B repeatedly appear in this order at the side surface of the twisted pair signal wire 12. As illustrated in FIG. 6, at the side surface of the twisted pair signal wire 12, a distance between the same cable along a center axis CA, such as the distance between the first signal wires 121A, for example, is a twist pitch Pt of the twisted pair signal wire 12.

The twist pitch can be measured by a method according to JIS C 3002 (1992), for example. Although the twisted pair signal wire 12 is described as an example, the twist pitch of the core or the like are defined similarly, and can be evaluated in a manner similar to the case where the twisted pair signal wire is evaluated.

An outer diameter D12 of the twisted pair signal wire 12 can be approximately the same as the outer diameter D11 of the power wire 11.

(Sheath Layer)

Figure 5B:
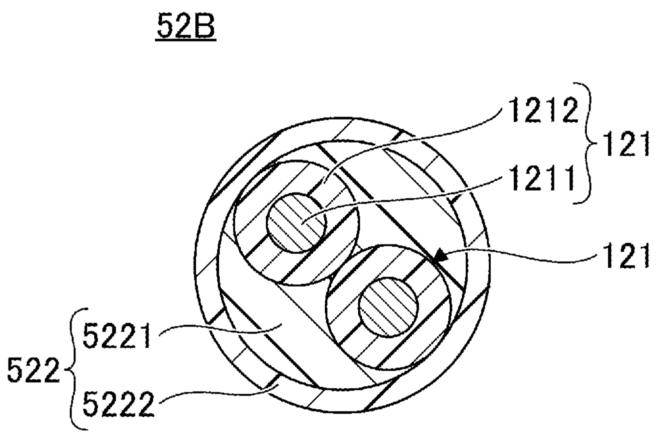
FIG. 5B is a diagram for explaining another configuration example of the twisted pair signal wire.

The twisted pair signal wire can further include a sheath layer 522 that covers the two signal wires 121 that are twisted together, similar to the twisted pair signal wire 52B illustrated in FIG. 5B. The sheath layer 522 can be formed of a single layer, or can be formed of two layers, namely, a first sheath layer 5221 and a second sheath layer 5222. As illustrated in FIG. 5B, the first sheath layer 5221 can be disposed so as to cover outer peripheries of the two signal wires, and the second sheath layer 5222 can be disposed so as to cover an outer periphery of the first sheath layer 5221.

A material used for the sheath layer 522 is not particularly limited, and for example, the same material as the second insulating layer 1212 can be used, or a material different from the material used for the second insulating layer 1212 can be used.

A material suitably used for the first sheath layer 5221 can be one or more kinds of materials selected from thermoplastic polyurethane elastomer, ethylene-vinyl acetate (EVA) copolymer, ethylene-ethyl acrylate (SEA) copolymer, or the like, for example. A material suitably used for the second sheath layer 5222 can be thermoplastic polyurethane elastomer or the like, for example.

The sheath layer 522 can be formed by wrapping a tape, or by a resin tube formed by extrusion molding.

(2-3) Electrical Wire, Twisted Pair Electrical Wire

As illustrated in the multi-core cable 20 of FIG. 2, the multi-core cable according to the present embodiment can have the twisted pair electrical wire 13 including the two electrical wires 131 that are twisted together. In addition, as illustrated in the multi-core cable 40 of FIG. 4, the multi-core cable according to the present embodiment can have one electrical wire 131.

The electrical wire 131 can include a third conductor 1311, and a third insulating layer 1312 covering the third conductor 1311. An outer diameter D1311 of the third conductor 1311 is preferably smaller than the outer diameter D111 of the first conductor 111. A size of the electrical wire 131, such as an outer diameter or the like, and a material used for the electrical wire 131, can be the same as those of the signal wire 121.

(2-3-1) Electrical Wire

The electrical wires 131 can be used to transmit a signal from the sensor or transmit a control signal from the ECU, or used as a power supply wire or the like for supplying power to an electronic device. The electrical wire 131 can also be used as a ground wire.

The third conductor 1311 can be formed by a plurality of element wires that are twisted together. For example, as illustrated in FIG. 2, the third conductor 1311 can include one conductor formed by a plurality of element wires twisted together, or include a plurality of such conductors. In a case where the third conductor 1311 includes a plurality of conductors, the plurality of conductors are preferably twisted together.

The third conductor 1311 can be formed of the same material as the conductor forming the first conductor 111 and the second conductor 1211 described above, or can be formed of a material different from the conductor forming the first conductor 111 and the second conductor 1211. A cross sectional area of the third conductor 1311 is not particularly limited, and can be greater than or equal to 0.13 $mm^2$ and less than or equal to 0.5 $mm^2$, for example. In a case where the third conductor 1311 includes a plurality of conductors, a sum of the cross sectional areas of the plurality of conductors included in the third conductor 1311 preferably satisfies the range described above.

The outer diameter D1311 of the third conductor 1311 is preferably smaller than the outer diameter D1211 of the second conductor 1211. By making the outer diameter D1311 of the third conductor 1311 smaller than the outer diameter D1211 of the second conductor 1211, the diameters of the electrical wire 131 and the twisted pair electrical wire 13 can be reduced, and the diameter of the multi-core cable can also be reduced. For this reason, it is possible to improve the handleability of the multi-core cable when performing the wiring or the like. In addition, although depending on the combination of the sheathed wires forming the multi-core cable, by making the outer diameter D1311 of the third conductor 1311 smaller than the outer diameter D1211 of the second conductor 1211, it is possible to make the cross section perpendicular to the longitudinal direction of the multi-core cable close to a perfect circle.

(Third Insulating Layer)

The Young's modulus of the third insulating layer 1312 is preferably greater than or equal to 700 MPa and less than or equal to 1600 MPa, more preferably greater than or equal to 700 MPa and less than or equal to 1550 MPa, and still more preferably greater than or equal to 1000 MPa and less than or equal to 1500 MPa. By setting the Young's modulus of the third insulating layer 1312 to a value greater than or equal to 700 MPa, the bending rigidity of the electrical wire 131 can be increased, and even in a case where the diameter of the electrical wire 131 is reduced, the terminal or the like can easily be attached to the end portion along the longitudinal direction. However, the multi-core cable is required to bend easily when wiring the automobile or the like, and to be handled with ease when routing the wiring. Accordingly, the Young's modulus of the third insulating layer 1312 of the electrical wire 131 is preferably greater than or equal to 1600 MPa. By setting the Young's modulus of the third insulating layer 1312 to a value less than or equal to 1600 MPa, the electrical wire 131 can easily be bent, and the handleability when performing the wiring can be improved. In addition, the flexing resistance of the electrical wire 131 can be increased, and disconnection can be reduced even in a case where the electrical wire is repeatedly bent and stretched.

Ae material used for the third insulating layer 1312 can be selected so that the Young's modulus falls within the range described above. The material used for the third insulating layer 1312 is not particularly limited, but the third insulating layer 1312 can include a composition including a resin material (synthetic resin) similar to that described for the second insulating layer 1212, for example, as a main component thereof. Because such a composition is already described with the second insulating layer 1212, a description thereof will be omitted.

(Outer Diameter)

An outer diameter D131 of the electrical wire 131 is not particularly limited, but is preferably greater than or equal to 1.00 mm and less than or equal to 1.38 mm, more preferably greater than or equal to 1.10 mm and less than or equal to 1.35 mm, and still more preferably greater than or equal to 1.15 mm and less than or equal to 1.30 mm. By setting the outer diameter D131 of the electrical wires 131 to a value greater than or equal to 1.00 mm, the bending rigidity of the electrical wire 131 can be particularly increased, and the workability when attaching the terminal or the Like to the end portion along the longitudinal direction of the electrical wire 131 can be improved. By setting the outer diameter D131 of the electrical wire 131 to a value less than or equal to 1.38 mm, the diameter of the electrical wire 131 can be reduced, and the diameter of the multi-core cable can also be reduced.

(2-3-2) Twisted Pair Electrical Wire (Twist Pitch of Twisted Pair Electrical Wire)

The twist pitch of the two electrical wires 131 in the twisted pair electrical wire 13 is not particularly limited, but is preferably greater than or equal to 20 times and less than or equal to 70 times, and more preferably greater than or equal to 25 times and less than or equal to 66 times the outer diameter D131 of the electrical wires 131, for example. By setting the twist pitch of the twisted pair electrical wire 13 to a value greater than or equal to 20 times the outer diameter D131 of the electrical wires 131, the unevenness of the surface of the twisted pair electrical wire can be reduced, so as to facilitate processing of the twisted pair electrical wire. In addition, by setting the twist pitch of the twisted pair electrical wire to a value less than or equal to 70 times the outer diameter D131 of the electrical wires 131, it is possible to improve the signal quality of the signal transmitted by the twisted pair electrical wire. It is also possible to improve the flexibility of the twisted pair electrical wire.

The outer diameter D13 of the twisted pair electrical wires 13 can be approximately the same as the outer diameter D11 of the power wire 11.

(2-4) Size of Each Portion

The size or the like of the sheathed electrical wire included in the multi-core cable can be selected according to the configuration, the usage, or the like of the multi-core cable, and is not particularly limited, but it is preferable to satisfy the following relationship, for example.

Similar to the multi-core cables illustrated in FIG. 1 through FIG. 4, in the multi-core cable including the power wires 11 and the twisted pair signal wire 12, it is preferable that the following relationship is satisfied. The outer diameter D11 of the power wire 11 is preferably approximately the same as the outer diameter D12 of the twisted pair signal wire 12. Further, the outer diameter D11 of the power wire 11 is preferably larger than the outer diameter D121 of the signal wire 121.

In a case where two kinds of power wires having different outer diameters are included as in the multi-core cable 30 illustrated in FIG. 3, it is preferable that the following relationship is satisfied.

An outer diameter D31 of the power wire 31, which is the second power wire, is preferably smaller than the outer diameter D11 of the power wire 11, which is the first power wire. In addition, the outer diameter D31 of the power wire 31, which is the second power wire, is preferably smaller than the outer diameter D12 of the twisted pair signal wire 12 and larger than the outer diameter D121 of the signal wire 121.

An outer diameter D311 of the first conductor 311 of the power wire 31, which is the second power wire, is preferably smaller than the outer diameter D111 of the first conductor 111 of the power wire 11, which is the first power wire. In addition, the outer diameter D311 of the first conductor 311 of the power wire 31, which is the second power wire, is preferably larger than the outer diameter D1211 of the second conductor 1211 of the signal wire 121.

In a case where electrical wires are included as in the multi-core cable 40 illustrated in FIG. 4, it is preferable that the following relationship is satisfied. The outer diameter D131 of the electrical wire 131 is preferably smaller than the outer diameter D11 of the power wire 11. Further, the outer diameter D131 of the electrical wire 131 is preferably smaller than the outer diameter D121 of the signal wire 121.

The outer diameter D1311 of the third conductor 1311 included in the electrical wire 131 is preferably smaller than the outer diameter D111 of the first conductor 111 included in the power wire 11. Further, the outer diameter D1311 of the third conductor 1311 is preferably smaller than the outer diameter D1211 of the second conductor 1211.

(3) Outer Sheath Layer

The multi-core cable according to the present embodiment can include an outer sheath layer 15 that covers the outer periphery of the core. In this case, the outer sheath layer 15 can be disposed to completely cover the core.

A material used for the outer sheath layer 15 is not particularly limited, and the outer sheath layer 15 can be formed of polyolefin-based resins, such as polyethylene, ethylene-vinyl acetate (EVA) copolymer, or the like, polyurethane elastomer (polyurethane resin), polyester elastomer, or a composition formed by mixing at least two such kinds of resins.

"Solumer" (product name, manufactured by SK Global Chemical Co., Ltd.) is an example of a commercially available polyethylene, "Evaflex" (product name, manufactured by DuPont-Mitsui Polychemicals Co., Ltd.) is an example of a commercially available EVA, and commercially available products of various grades can be appropriately selected and used.

In addition, the material used for the outer sheath layer 15 can be a crosslinked/non-crosslinked thermoplastic polyurethane (TPU) having an excellent abrasion resistance, for example. The material suitably used for the outer sheath layer 15 can be the crosslinked thermoplastic polyurethane because of an excellent heat resistance thereof. "Elastollan" (product name, manufactured by BASF SE) and "Miractran" (product name, manufactured by Tosoh Corporation) are examples of commercially available thermoplastic polyurethanes, and commercially available products of various grades can be appropriately selected and used.

The outer sheath layer 15 can include various additives, as required. An inorganic material, such as a flame retardant or the like, for example, can be included as the additive. In a case where the inorganic material, such as the flame retardant or the like, is mixed to the resin material of the outer sheath layer 15, a compound ratio thereof is not particularly limited. For example, the inorganic material, such as the flame retardant or the like, is preferably added with an amount less than or equal to 12 parts by mass, and more preferably less than or equal to 10 parts by mass, with respect to 100 parts by mass of the resin material.

Examples of the inorganic material that can be added include one or more kinds of material selected from antimony trioxide, aluminum hydroxide, magnesium hydroxide, and talc.

The outer sheath layer 15 can have a first outer sheath layer 151, and a second outer sheath layer 152. In this case, the first outer sheath layer 151 and the second outer sheath layer 152 can be made of different materials, or can be made of the same material.

The materials used for the first outer sheath layer 151 and the second outer sheath layer 152 are not particularly limited, and the materials described above for the outer sheath layer 15 can be used therefor, for example.

The material suitably used for the first outer sheath layer 151 can be one or more kinds of resins selected from polyurethane resins and polyolefin-based resins.

The material suitably used for the second outer sheath layer 152 can be a polyurethane resin having an excellent abrasion resistance. Because the second outer sheath layer 152 is disposed on the outer side of the multi-core cable, the durability of the multi-core cable can be particularly increased by using the polyurethane resin as the material of the second outer sheath layer 152.

Each of the first outer sheath layer 151 and the second outer sheath layer 152 can include the inorganic material described above.

(4) Wrapping Tape

The multi-core cable according to the present embodiment can have a wrapping tape 16 that covers the outer periphery of the core, for example. By disposing the wrapping tape 16, it is possible to stably maintain the twisted shape of the sheathed electrical wires, such as the power wires 11 or the like, forming the core. The wrapping tape 16 can be provided on the inner side the outer sheath layer 15.

For example, a paper tape, a nonwoven fabric, or a tape made of a resin, such as polyester or the like, can be used for the wrapping tape 16. In addition, the wrapping tape 16 can be wound spirally along the longitudinal direction of the core, or can be longitudinally lapped, that is, a longitudinal direction of the wrapping paper is disposed along the longitudinal direction of the core. Moreover, the twisting direction can be a Z-twist or an S-twist. The wrapping tape 16 can be wound in the same direction as the twisting direction of the twisted pair signal wire 12 or the like included in the core, or can be wound in a direction opposite to the twisting direction. However, when the twisting direction of the wrapping tape 16 and the twisting direction of the twisted pair signal wire 12 or the like are opposite to each other, an unevenness is less likely to occur on a surface of the wrapping tape 16, and is preferably in that it is easy to stabilize an outer diametrical shape of the multi-core cable.

Because the wrapping tape 16 exhibits a cushioning effect and has a function of increasing the flexibility and a function of protecting from the outside, the outer sheath layer 15 can be configured to be thin in the case where the wrapping tape 16 is provided. By providing the wrapping tape 16 in this manner, it is possible to provide a multi-core cable which can be bent more easily and has an excellent abrasion resistance.

In addition, in a case where the outer sheath layer 15 or the like made of resin is provided by extrusion coating, the resin may enter between the plurality of sheathed electrical wires, such as the power wires 11 or the like, forming the core, and it may become difficult to separate the plurality of sheathed electrical wires at the end of the multi-core cable. Hence, by providing the wrapping tape 16, it is possible to prevent the resin from entering between the plurality of sheathed electrical wires, and facilitate extraction of the plurality of sheathed electrical wires, such as power wires or the like, at the end of the multi-core cable.

(5) Inclusion

Further, the multi-core cable according to the present embodiment can have an inclusion 17 in a region between the outer sheath layer 15 and the core, for example. The inclusion 17 can be formed of fibers, such as staple yarns, nylon yarns, or the like. The inclusion can be formed of tensile fibers.

The inclusion 17 can be disposed in a gap formed between the sheathed electrical wires, such as between the power wires 11 or between the power wire 11 and the signal wire 121.

Although the embodiments are described above in detail, the present invention is not limited to specific embodiments, and various variations and modifications can be made within the scope defined in the claims.

Exemplary Implementations

Hereinafter, specific exemplary implementations will be described, however, the present invention is not limited to these exemplary implementations.

(Evaluation Method)

First, a method of evaluating the multi-core cable manufactured in the following experimental examples will be described.

(1) Evaluation of Young's Modulus

The Young's moduli of the first conductor 111 and the first insulating layer 112 of the power wire 11, and the second conductor 1211 and the second insulating layer 1212 of the signal wire 121, were determined by measuring tensile stresses when a rate of pulling is 1 mm/minute and a degree of extensibility is 2.5%.

Tubular samples, obtained by extracting the conductors from the power wires and the signal wires manufactured in each of the following experimental examples, were used as measurement samples of the first insulating layer 112 and the second insulating layer 1212. A cross sectional area of the sample was calculated from the outer diameters of the power wires and the signal wires, and the outer diameters of the conductors.

A tester based on JIS K 7161 (2014) was used as a Young's modulus measuring apparatus.

(2) Flexing Resistance Test

The multi-core cables obtained in the following experimental examples were subjected to a flexing resistance test by a method in conformance with JIS C 6851 (2006) (optical fiber characteristic test method).

Figure 7:
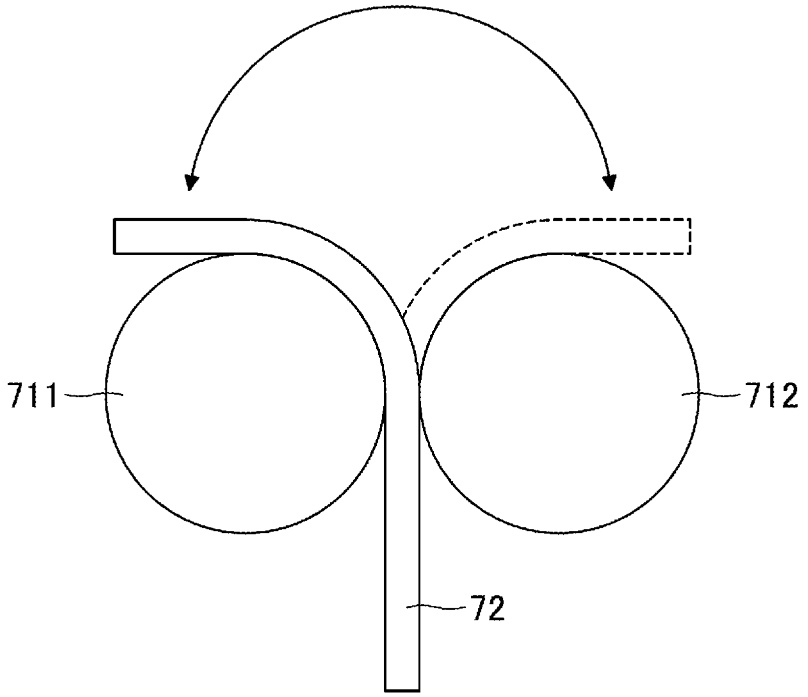
FIG. 7 is a diagram schematically illustrating a flexing resistance test method in an experimental example.

More particularly, as illustrated in FIG. 7, a multi-core cable 72 to be evaluated is disposed in a vertical direction and sandwiched between two mandrels 711 and 712 respectively having a diameter of 60 mm and disposed parallel to each other along a horizontal direction. Next, a process of bending an upper end of the multi-core cable 72 by 90° from vertical toward an upper side of the mandrel 711 to make contact therewith, and thereafter bending the upper end of the multi-core cable 72 by 90° from vertical toward the an upper side of the mandrel 712 to make contact therewith, is repeated in a thermostatic chamber at −30° C. This process is repeated while measuring all of resistance values of the two power wires 11 and the two signal wires 121 with respect to the multi-core cable 10 of FIG. 1, for example, and determining, as an index value of the flexing resistance test, the number of times the process is repeated by the time the resistance increases to a value greater than or equal to 10 times an initial resistance value. The number of times bent, to be evaluated in the flexing resistance test, can be determined by counting one bend when the multi-core cable 72 is bent to the right side in FIG. 7, then bent to the left side, and bent back to the right side.

The larger the index value of the flexing resistance test, that is, the larger the number of times the multi-core cable is bent, the better the flexing resistance becomes.

The flexing resistance evaluation of the flexing resistance test is A when the number of times bent is greater than or equal to 100,000 times, B when the number of times bent is in a range greater than or equal to 50,000 times and less than 100,000 times, C when the number of times bent is in a range greater than or equal to 30,000 times and less than 50,000 times, and D when the number of times bent is less than 30,000 times.

The flexing resistance is the highest in the case where the flexing resistance evaluation of the flexing resistance test is A, and the flexing resistance decreases for B and C in this order.

(3) Overall Evaluation

With regard to a rigidity evaluation which will be described later, 3 points were given for A, 2 points were given for B, and 0 point was given for C.

3 points were given for the flexing resistance evaluation A or B, 1 point was given for the flexing resistance evaluation C, and 0 point was given for the flexing resistance evaluation D.

An overall evaluation is A when a total score of the rigidity evaluation and the flexing resistance evaluation is 6 points, B when the total score is 5 points, C when the total score is 4 points, and D when the total store is 3 points or less.

The overall evaluation A for the rigidity evaluation and the flexing resistance evaluation is A is the highest, and the overall evaluation decreases for B, C, and D in this order.

Experimental Examples

Hereinafter, experimental conditions will be described. Experimental example 1 through experimental example 7 are exemplary implementations, and experimental example 8 through experimental example 11 are comparative examples.

Experimental Example 1

The multi-core cable 10 illustrated in FIG. 1 was manufactured and evaluated. The manufactured multi-core cable 10 includes two power wires 11, and a twisted pair signal wire 12 including two signal wires 121. The power wires 11 and the twisted pair signal wire 12 are twisted together to form a core 14.

Each member will be described below.

(1) Power Wire

The power wire 11 includes first conductors 111, and a first insulating layer 112 covering outer peripheries of the first conductors 111.

The first conductor 111 is formed by combining and further twisting 7 stranded wires each formed by twisting 36 conductor element wires which are copper alloy wires. That is, the first conductor 111 of the power wire 11 includes 252 conductor element wires in total, as illustrated in Table 2. An element wire diameter of the conductor element wires used was 0.080 mm, as illustrated in Table 2.

The first conductors 111 had an outer diameter of 1.700 mm, a cross sectional area of 1.27 $mm^2$, and a Young's modulus of 120 GPa.

The outer diameter of the first conductor 111 was measured in accordance with JIS C 3005 (2014). More particularly, the outer diameter of the first conductor was measured at two positions on the same plane perpendicular (at right angles) to the center axis (wire axis) of the power wire, and an average value thereof was determined as the outer diameter of the first conductor. The outer diameter of the first conductor 111 was measured along two orthogonal diameters on the plane perpendicular to the center axis of the first conductor 111 to be measured, and the average value thereof was determined as the outer diameter of the first conductor 111. The outer diameters of the second conductor, the first insulating layer, and the second insulating layer which will be described later were also measured in a similar manner.

The material used for the first insulating layer 112 was a resin of a compound example 2 for the first insulating layer in Table 1 described above. More particularly, a resin including a high-density polyethylene having a content percentage of 50 mass %, an EVA having a content percentage of 35 mass %, and a low-density polyethylene as a remainder, was used for the resin material. The Young's modulus of the first insulating layer 112 was 700 MPa.

The outer diameter D11 of the power wire 11 including the first conductor 111 described above and the first insulating layer was 2.300 mm.

In addition, the bending rigidity of the power wire 11 was calculated according to the following formula (1). In Table 2, the bending rigidity E1×I1 of the first conductor is illustrated under the "conductor rigidity" column, the value of the bending rigidity E2×I2 of the first insulating layer is illustrated under the "insulator rigidity" column, and the rigidity of the power wire, which is the sum of the rigidity of the first conductor and the rigidity of the first insulating layer, is illustrated under the "power wire rigidity" column.

Table 2 also illustrates a moment of inertia of cross section, I1 of the first conductor, and a moment of inertia of cross section, I2 of the first insulating layer.

$$(\text{Power wire rigidity})=E1\times I1+E2\times I2 \quad (1)$$

E1, E2, I1, and I2 of the formula (1) above respectively denote the following, where E1: Young's modulus (GPa) of the first conductive layer, E2: Young's modulus (GPa) of the first insulating layer, I1: moment of inertia of cross section of the first conductive layer, and I2: moment of inertia of cross section of the first insulating layer.

I1 and I2 were calculated from the following formulas (2) and (3), respectively.

$$I1=(\pi\cdot D^4/64)\times N \quad (2)$$

$$I2=\pi(D2^4-D1^4)/64 \quad (3)$$

D, D1, D2, and N of the formula (2) and the formula (3) above respectively denote the following, where D: element wire diameter (mm), D1: inner diameter (mm) of the first insulating layer (outer diameter of the first conductor), D2: outer diameter (mm) of the first insulating layer, and N: number of element wires.

(2) Signal Wire

The twisted pair signal wire 12 has two signal wires 121 twisted together. The signal wire 121 includes a second conductor 1211, and a second insulating layer 1212 covering the outer periphery of the second conductor 1211.

The second conductor 1211 is formed by twisting together 40 conductor element wires which are copper alloy wires. The element wire diameter of the conductor, which is the element wire diameter of the conductor element wire used, was 0.080 mm as illustrated in Table 3.

The second conductors 1211 had an outer diameter of 0.60 mm, a cross sectional area of 0.20 $mm^2$, and a Young's modulus of 120 GPa.

A twist pitch of the twisted pair signal wire was 80 mm. The twist pitch was measured by the method described in JIS C 3002 (1992).

The material used for the second insulating layer 1212 was a resin of a compound example 4 for the second insulating layer in Table 1 described above. More particularly, a resin including a high-density polyethylene having a content percentage of 50 mass %, and a low-density polyethylene as a remainder, was used for the resin material. The Young's modulus of the second insulating layer 1212 was 1500 MPa. The outer diameter of the second insulating layer 1212, that is, the outer diameter D121 of the signal wire 121, was 1.20 mm.

The bending rigidity of the signal wire 121 was calculated according to the formula (1), similar to the case of the power wire. With regard to the parameters in the formulas, the first conductor and the first insulating layer are replaced with the second conductor and the second insulating layer, respectively. That is, E1 and E2, for example, denote the following, where E1: the Young's modulus (GPa) of the second conductive layer, and E2: the Young's modulus (GPa) of the second insulating layer. The same applies to the other parameters.

In Table 3, the bending rigidity E1×I1 of the second conductor is illustrated under the "conductive rigidity" column of the second conductor, and the value of the bending rigidity E2×I2 of the second insulating layer is illustrated under the "insulating rigidity" column of the second insulating layer. Further, the rigidity of the signal wire, which is the sum of the rigidity of the second conductor and the rigidity of the second insulating layer, is illustrated in the "signal wire rigidity" column. Table 2 also illustrates the moment of inertia of cross section of the second conductor, and the moment of inertia of cross section of the second insulating layer.

Further, in the rigidity evaluation column, the evaluation is A when the obtained rigidity of the signal wire was greater than or equal to 0.10 N·$mm^2$. The evaluation is B when the rigidity of the signal wire was greater than or equal to 0.075 N·$mm^2$ and less than 0.10 N·$mm^2$. The evaluation was C when the rigidity of the signal wire was less than 0.075 N·$mm^2$. The evaluation results are illustrated in Table 3.

As is evident from reference values of the evaluations, the bending rigidity is the highest for the evaluation A, and the bending rigidity decreases for the evaluations B and C in this order. When the evaluation is A or B, the signal wire has a sufficient bending rigidity, and the terminal or the like can easily be attached to the end portion thereof. When the evaluation is C, the signal wire does not have a sufficient rigidity, and it is difficult to attach the terminal or the like to the end portion thereof.

(3) Core

The core 14 is formed of the two power wires 11 described above, and the twisted pair signal wire 12 that are twisted together along the longitudinal direction. The twist pitch of the core 14 was 80 mm, and the outer diameter D14 of the core 14 was 5.2 mm. The inclusion 17 was not provided.

The outer diameter D14 of the core 14 was measured and calculated by the following procedure. In three cross sections to be measured, arranged along the longitudinal direction of the multi-core cable, the length of the core along the long axis was measured by a micrometer. The distance between adjacent cross sections to be measured was 1 m along the longitudinal direction of the multi-core cable. The average value of the lengths of the core along the long axis, measured for the three cross sections to be measure, was defined as the outer diameter D14 of the core 14.

(4) Wrapping Tape, Outer Sheath Layer

Thin paper was disposed around the core, as the wrapping tape 16, and the outer sheath layer 15 was disposed so as to cover the core 14.

The outer sheath layer 15 was formed of the first outer sheath layer 151 made of a crosslinked ethylene-vinyl acetate copolymer, and the second outer sheath layer 152 made of a crosslinked polyurethane resin disposed so as to cover the outer periphery of the first outer sheath layer 151. The outer diameter of the outer sheath layer 15 was 6.9 mm.

The evaluation results are illustrated in Table 3.

Experimental Example 2 Through Experimental Example 4

The multi-core cables were manufactured and evaluated in a manner similar to experimental example 1, except that the thickness of the second insulating layer 1212 was varied and the outer diameter of the second insulating layer, that is, the outer diameter D121 of the signal wire 121, was set to the values illustrated in Table 3 when manufacturing the signal wire 121. The outer diameter D14 of the core 14 was 5.3 mm in the experimental example 2, 5.4 mm in the experimental example 3, and 5.0 mm in the experimental example 4.

The evaluation results are illustrated in Table 3.

Experimental Example 5 Through Experimental Example 7

The multi-core cables were manufactured and evaluated in a manner similar to the experimental example 1, except that the compound of the material used for the second insulating layer 1212 was varied when manufacturing the signal wire 121.

More particularly, the resins with the compounds illustrated in Table 1 were used so that the Young's modulus of the second insulating layer 1212 assumes the values illustrated in Table 3. That is, the resin of a compound example 3 in Table 1 was used in the experimental example 5, the resin of the compound example 2 in Table 1 was used in the experimental example 6, and the resin of a compound example 5 in Table 1 was used in the experimental example 7.

The outer diameter D14 of the core 14 was 5.2 mm in each of the experimental example 5 through experimental example 7.

The evaluation results are illustrated in Table 3.

Experimental Example 8 Through Experimental Example 10

The material used for the second insulating layer 1212 was varied when manufacturing the signal wire 121. More particularly, the resin of a compound example 1 in Table 1 was used. The thickness of the second insulating layer 1212 was varied, and the outer diameter of the second insulating layer, that is, the outer diameter D121 of the signal wire 121, was varied to the values illustrated in Table 3. The multi-core cables were manufactured and evaluated in a manner similar to the experimental example 1, except for the above noted points.

The outer diameter D14 of the core 14 was 5.2 mm in the experimental example 8, 5.3 mm in the experimental example 9, and 5.4 mm in the experimental example 10.

The evaluation results are illustrated in Table 3.

Experimental Example 11

The material used for the second insulating layer 1212 was varied when manufacturing the signal wire 121. More particularly, the resin of a compound example 6 in Table 1 was used. The multi-core cable was manufactured and evaluated in a manner similar to the experimental example 1, except for the above noted points. The outer diameter D14 of the core 14 was 5.2 mm.

The evaluation results are illustrated in Table 3.

TABLE 2

| | | | |
|---|---|---|---|
| First conductor | Element wire diameter | mm | 0.080 |
| | Number of wires | Wires | 252 |
| | Outer diameter | mm | 1.700 |
| | Young's modulus | GPa | 120 |
| | Moment of inertia of cross section (conductor) | $mm^4$ | $5.0 \times 10^{-4}$ |
| | Conductor rigidity | $N \cdot mm^2$ | 0.061 |
| First insulating layer | Outer diameter (D11) | mm | 2.300 |
| | Young's modulus | MPa | 700 |
| | Moment of inertia of cross section | $mm^4$ | 0.964 |
| | Insulator rigidity | $N \cdot mm^2$ | 0.675 |
| | Power wire rigidity | $N \cdot mm^2$ | 0.735 |

TABLE 3

| | | | Experimental example 1 | Experimental example 2 | Experimental example 3 | Experimental example 4 | Experimental example 5 | Experimental example 6 |
|---|---|---|---|---|---|---|---|---|
| Second conductor | Element wire diameter | mm | 0.080 | 0.080 | 0.080 | 0.080 | 0.080 | 0.080 |
| | Number of wires | Wires | 40 | 40 | 40 | 40 | 40 | 40 |
| | Outer diameter (D1211) | mm | 0.60 | 0.60 | 0.60 | 0.60 | 0.60 | 0.60 |
| | Young's modulus | GPa | 120 | 120 | 120 | 120 | 120 | 120 |
| | Moment of inertia of cross section (conductor) | $mm^4$ | $8.0 \times 10^{-5}$ | $8.0 \times 10^{-5}$ | $8.0 \times 10^{-5}$ | $8.0 \times 10^{-5}$ | $8.0 \times 10^{-5}$ | $8.0 \times 10^{-5}$ |
| | Conductor rigidity | $N \cdot mm^2$ | 0.010 | 0.010 | 0.010 | 0.010 | 0.010 | 0.010 |

TABLE 3-continued

| | | | | | | | | |
|---|---|---|---|---|---|---|---|---|
| Second insulating layer | Outer diameter (D121) | mm | 1.20 | 1.30 | 1.35 | 1.10 | 1.20 | 1.20 |
| | Young's modulus | MPa | 1500 | 1500 | 1500 | 1500 | 1160 | 700 |
| | Moment of inertia of cross section | $mm^4$ | 0.095 | 0.134 | 0.157 | 0.066 | 0.095 | 0.095 |
| | Insulator rigidity | $N \cdot mm^2$ | 0.143 | 0.201 | 0.235 | 0.098 | 0.111 | 0.067 |
| Signal line rigidity | | $N \cdot mm^2$ | 0.153 | 0.210 | 0.245 | 0.108 | 0.120 | 0.076 |
| Rigidity evaluation | | | A | A | A | A | A | B |
| Flexing resistance evaluation | | | B | B | B | B | B | B |
| Overall evaluation | | | A | A | A | A | A | B |

| | | | Experimental example 7 | Experimental example 8 | Experimental example 9 | Experimental example 10 | Experimental example 11 |
|---|---|---|---|---|---|---|---|
| Second conductor | Element wire diameter | mm | 0.080 | 0.080 | 0.080 | 0.080 | 0.080 |
| | Number of wires | Wires | 40 | 40 | 40 | 40 | 40 |
| | Outer diameter (D1211) | mm | 0.60 | 0.60 | 0.60 | 0.60 | 0.60 |
| | Young's modulus | GPa | 120 | 120 | 120 | 120 | 120 |
| | Moment of inertia of cross section (conductor) | $mm^4$ | $8.0 \times 10^{-5}$ | $8.0 \times 10^{-5}$ | $8.0 \times 10^{-5}$ | $8.0 \times 10^{-5}$ | $8.0 \times 10^{-5}$ |
| | Conductor rigidity | $N \cdot mm^2$ | 0.010 | 0.010 | 0.010 | 0.010 | 0.010 |
| Second insulating layer | Outer diameter (D121) | mm | 1.20 | 1.20 | 1.30 | 1.35 | 1.20 |
| | Young's modulus | MPa | 1600 | 400 | 400 | 400 | 1800 |
| | Moment of inertia of cross section | $mm^4$ | 0.095 | 0.095 | 0.134 | 0.157 | 0.095 |
| | Insulator rigidity | $N \cdot mm^2$ | 0.153 | 0.038 | 0.054 | 0.063 | 0.171 |
| Signal line rigidity | | $N \cdot mm^2$ | 0.162 | 0.048 | 0.063 | 0.072 | 0.181 |
| Rigidity evaluation | | | A | C | C | C | A |
| Flexing resistance evaluation | | | C | A | A | A | D |
| Overall evaluation | | | C | D | D | D | D |

According to the results illustrated in Table 3, it was confirmed that there is a correlation between the bending rigidity of the signal wire 121 and the Young's modulus of the second insulating layer 1212 of the signal wire 121. In addition, it was confirmed that, by setting the Young's modulus of the second insulating layer 1212 to a value greater than or equal to 700 MPa, even in a case where the diameter of the signal wire 121 is reduced approximately to a value less than 1.4 mm, the bending rigidity of the signal wire 121 can be sufficiently increased, and the terminal or the like can easily be attached to the end portion of the signal wire 121.

DESCRIPTION OF REFERENCE NUMERALS

10, 20, 30, 40, 72 multi-core cable
11, 31 power wire
D11, D31 outer diameter of power wire
111, 311 first conductor
D111, D311 outer diameter of first conductor
112, 312 first insulating layer
12, 52A, 52B twisted pair signal wire
D12 outer diameter of twisted pair signal wire
121, 521 signal wire
121A first signal wire
121B second signal wire
1211, 5211 second conductor
D1211 outer diameter of second conductor
1212, 5212 second insulating layer
D121 outer diameter of signal wire
522 sheath layer
5221 first sheath layer
5222 second sheath layer
13 twisted pair electrical wire
D13 outer diameter of twisted pair electrical wire
131 electrical wire
D131 outer diameter of electrical wire
1311 third conductor
D1311 outer diameter of third conductor
1312 third insulating layer
14, 24, 34, 44 core
D14, D24, D34, D44 outer diameter of core
15 outer sheath layer
151 first outer sheath layer
152 second outer sheath layer
16 wrapping tape
17 inclusion
CA center axis
Pt twist pitch
711, 712 mandrel

The invention claimed is:

1. A multi-core cable comprising:

two first wires;

a twisted pair signal wire having two twisted second wires, wherein the two first wires and the second wires are twisted together to form a core;

an outer sheath layer covering an outer periphery of the core; and a wrapping tape disposed between the core and the outer sheath layer, wherein:

each of the two first wires includes a first conductor, and a first insulating layer covering the first conductor, each of the second wires includes a second conductor, and a second insulating layer covering the second conductor, a Young's modulus of the second insulating layer is greater than or equal to 700 MPa and less than or equal to 1600 MPa, a Young's modulus of the first insulating layer is smaller than the Young's modulus of the second insulating layer, a thickness of the first insulating layer is greater than a thickness of the second insulating layer, the core further includes two third wires, an outer diameter of each of the two third wires is smaller than an outer diameter of each of the two first wires, and is larger than an outer diameter of each of the second wires, each of the two third wires are disposed so as to make contact with each other, one third wire of the two third wires is disposed so as to make contact with one first wire of the two first wires, and the other third wire of the two third wires is disposed so as to make contact with the twisted pair signal wire.

2. The multi-core cable as claimed in claim 1, wherein the second insulating layer includes high-density polyethylene, and one or more kinds of materials selected from low-density polyethylene and an ethylene-vinyl acetate copolymer, and a content percentage of the high-density polyethylene is greater than or equal to 40 mass % and less than or equal to 60 mass %.

3. The multi-core cable as claimed in claim 1, wherein an outer diameter of each of the second wires is greater than or equal to 1.00 mm and less than or equal to 1.35 mm, and a twist pitch of the second wires is greater than or equal to 20 times and less than or equal to 80 times the outer diameter of each of the second wires.

4. The multi-core cable as claimed in claim 1, wherein an outer diameter of each of the two first wires is greater than or equal to 2.20 mm and less than or equal to 2.50 mm, and a twist pitch of the core is greater than or equal to 10 times and less than or equal to 25 times an outer diameter of the core.

5. The multi-core cable as claimed in claim 1, wherein an outer diameter of each of the second wires is greater than or equal to 1.10 mm and less than or equal to 1.32 mm, and the Young's modulus of the second insulating layer is greater than or equal to 700 MPa and less than or equal to 1550 MPa.

6. The multi-core cable as claimed in claim 1, wherein an outer diameter of each of the second wires is greater than or equal to 1.15 mm and less than or equal to 1.30 mm, and the Young's modulus of the second insulating layer is greater than or equal to 1000 MPa and less than or equal to 1500 MPa.

7. The multi-core cable as claimed in claim 1, comprising:

a twisted pair electrical wire having two twisted electrical wires, each of the electrical wires includes a third conductor, and a third insulating layer covering the third conductor, the core includes the twisted pair electrical wire, with the first wires, the second wires, and the electrical wires twisted together, and a Young's modulus of the third insulating layer is greater than or equal to 700 MPa and less than or equal to 1600 MPa.

8. The multi-core cable as claimed in claim 7, wherein an outer diameter of the third conductor is smaller than an outer diameter of the second conductor.

9. The multi-core cable as claimed in claim 1, wherein:

the outer sheath layer includes a first outer sheath layer, and a second outer sheath layer covering the first outer sheath layer, the first outer sheath layer is formed of one or more kinds of resins selected from a group consisting of polyurethane resins and polyolefin-based resins, and the second outer sheath layer is formed of a polyurethane resin.

10. The multi-core cable as claimed in claim 1, wherein:

each of the two first wires is a power line, and each of the two second wires is a signal line.

* * * * *